June 7, 1927.
J. M. SIMPSON
1,631,937
TRANSMISSION GEARING
Filed Aug. 14, 1925
2 Sheets-Sheet 1
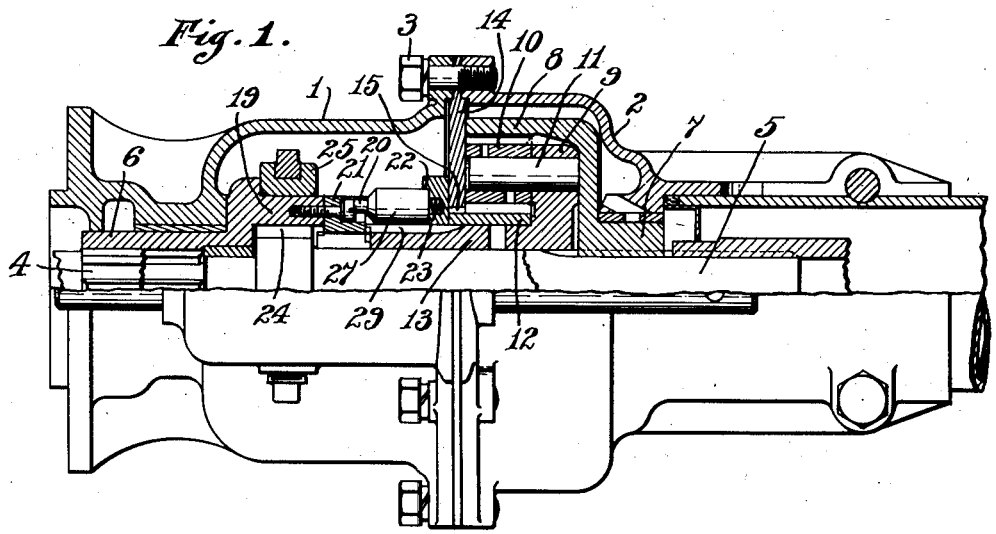
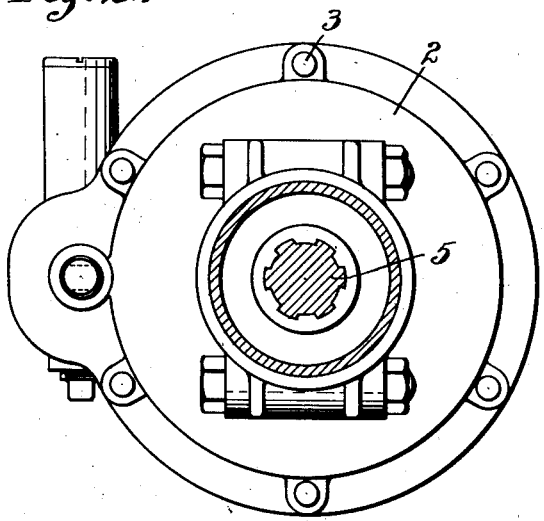
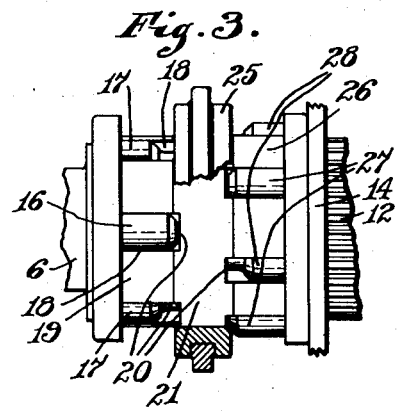
INVENTOR.
John M. Simpson,
BY
Hood + Hahn.
ATTORNEYS

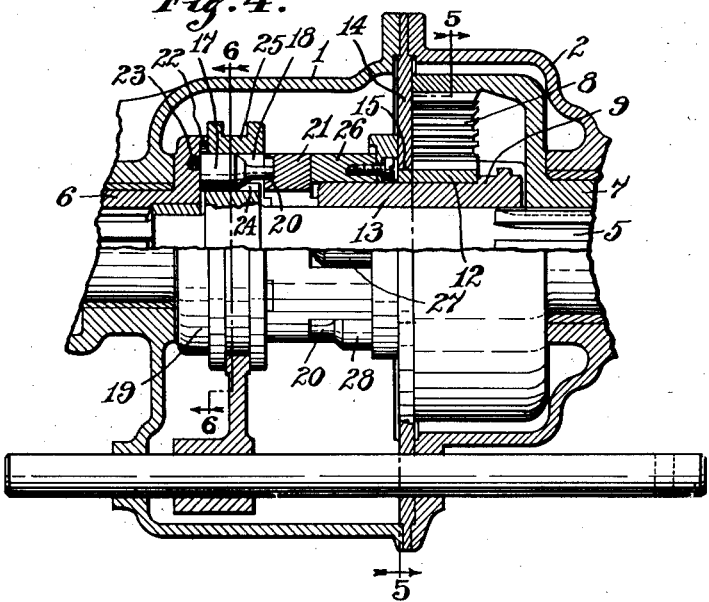

Patented June 7, 1927.

1,631,937

UNITED STATES PATENT OFFICE.

JOHN M. SIMPSON, OF MUNCIE, INDIANA, ASSIGNOR TO WARNER GEAR COMPANY, OF MUNCIE, INDIANA, A CORPORATION OF INDIANA.

TRANSMISSION GEARING.

Application filed August 14, 1925. Serial No. 50,168.

My invention relates to improvements in transmissions and particularly in transmissions for automobiles and the like.

One of the objects of my invention is to provide a speed changing transmission more particularly of the planetary gear type which will permit the changing of gears in this type of transmission smoothly and efficiently and without undue strain on the parts.

A further object of my invention is to provide a transmission of the above type which may be readily assembled and disassembled and which may be cheaply manufactured.

For the purpose of disclosing my invention I have illustrated one embodiment thereof in the accompanying drawings in which—

Fig. 1 is a side view partly in section of a transmission embodying my invention;

Fig. 2 is an end elevation thereof;

Fig. 3 is a detail elevation, partly in section, of the clutch embodied in my invention;

Fig. 4 is a plan elevation partly in section;

Fig. 5 is a sectional view on the line 5—5 of Fig. 4, and

Fig. 6 is a detail section on the line 6—6 of Fig. 4.

In the embodiment illustrated I provide an enclosing casing comprising the two sections 1 and 2 secured together by suitable bolts 3 passing through annular flanges thereon. The driven shaft 4 enters the section 1 at one end and the driving shaft 5 projects into the section 2 at the opposite end being suitably journaled therein. This driving shaft at its inner end is piloted in the hub 6 which has a bearing in the end of the casing 1 and is splined on the driven shaft 4.

The driving shaft 5 has keyed thereon the hub 7 of an internal gear 8 and loosely mounted thereon and within the gear 8 is a spider or pinion carrier 9 carrying a plurality of, in the present instance 3, pinions 10 which are rotatably supported on stub shafts 11 mounted on the spider. These pinions mesh with the internal gear 8 and also mesh with a sun gear 12 surrounding the hub 13 of the pinion carrier 9, the sun gear and hub being relatively rotatable. For the purpose of holding the sun gear 12 against rotation and maintaining the planetary pinions 10 on their shafts I provide a locking disc 14 which is stationarily clamped in position between the two sections of the casing and centrally is provided with a geared center opening 15 the teeth of which are adapted to mesh with the teeth of the sun gear 12.

The driving and driven shafts are adapted to be directly connected or the driving and driven shafts are adapted to be connected through the planetary driving gear by means of a roller clutch device. This clutch device, in effect, provides two clutches one of which is adapted to connect the driving and driven shafts directly and the other being adapted to connect the driving and driven shafts through the planetary gear. To this end I provide a plurality of radially disposed rollers 16 and 17, the rollers 16 being longer than the rollers 17 and operating in a plurality of radial slots 18 formed in a collar 19 extending from the hub 6 and overhanging the end of the driving shaft 5, the collar 19 thus forming a cage for the rollers. Each of the rollers is provided with a pin end 20 operating in a radial guide groove in a collar or end closure 21 secured adjacent the end of the cage. The opposite ends of the rollers are flat and are slidably disposed in guide recess 22, suitable springs 23 being arranged behind the flat ends of the rollers to afford a slight friction to maintain the rollers against moving radially inwardly when the parts are at rest. The rollers 17 are arranged about the end of the shaft 5 to alternate with the rollers 16 and the shaft end 5 is provided with splines 24 into which the rollers are adapted to be moved for the purpose of clutching the shaft 5 with the hub 6 and thereby with the driven shaft 4. In the present instance each spline takes care of a pair of rollers, one long and one short, and the rollers are forced radially inward by a sliding collar 25 suitably operated by any desired shifting mechanism. The cage for this set of rollers is extended to form a second cage 26 surrounding the hub 13 of the pinion carrier 9 and this cage is likewise provided with a plurality of alternately arranged clutching rollers, long and short, 27 and 28, mounted in a manner similar to the rollers 16 and 17 and adapted to take into splines 29 formed in the hub 13. These rollers are likewise operated by the collar 25 and it will be noted that when the collar 25 is in an intermediate position between the two sets of rollers the parts are all in neutral position and the driven and driving shafts are disconnected. When, however, the collar 25 is slid to the left thereby engaging the rollers 16 and 17 and forcing them radially inward into the splines 24, the hub 6, keyed on the shaft 4 is directly connected to the driving shaft 5 so that the shaft 4 is driven direct from the shaft 5. When, however, the collar 25 is moved in the opposite direction and into engagement with the rollers 27 and 28 to force these rollers radially inward into the splines 29, the driving connection between the shaft 5 and the shaft 4 will be through the planetary gear drive. As the internal gear 8 is driven from the shaft 5 and the sun gear 12 is held against rotation and the pinions 11 are meshed with both the sun gear and the internal gear, the rotation of the internal gear 8 will cause a rotation of the pinion carrier 9 at a reduced speed. Due to the fact that the rollers 27 and 28 connect the hub of the pinion carrier with the shaft 4 the shaft 4 will likewise be driven at this reduced speed.

I claim as my invention:

1. The combination with a driving shaft and a driven shaft, of a planetary gear system including a ring gear driven from said driving shaft, a sun gear and intermediate gears, means for holding the sun gear against rotation, a clutch including two sets of radially movable rollers connected to the driven shaft and co-operating respectively with means on the driving shaft and with means connected to the intermediate gears and means for operating one of said sets of rollers to connect the parts to drive the driven shaft directly from the driving shaft or to drive the driven shaft from said driving shaft through said planetary gear.

2. The combination with a driving and a driven shaft, of a planetary gear system including a ring gear driven from the driving shaft, a sun gear and intermediate gears, means for holding the sun gear against rotation, one of said shafts having radially disposed recesses therein and a member of said planetary gear being provided with similar radially disposed recesses, a clutch including two sets of radially movable rollers arranged to co-operate respectively with said radial recesses and means for operating said sets of rollers to cause the driving shaft to operate the driven shaft at the same speed or to connect the driving shaft with the driven shaft through said planetary gear.

3. The combination with a driving and a driven shaft, said driving shaft having radially disposed recesses, of a planetary gear including a ring gear driven from said driving shaft, a sun gear relatively stationary to said shaft, intermediate gears mounted on a driven member having radially disposed recesses and a clutch including two sets of radially movable rollers operatively connected to the driven shaft and means for optionally moving the rollers of one set into the recesses of the driving shaft or the rollers of the other set into the recesses of the driven member.

4. The combination with a driving shaft and a driven shaft, said driving shaft having radially disposed recesses, of a planetary gear including a ring gear driven from said driving shaft, a sun gear relatively stationary to said shaft and intermediate gears mounted on a driven member normally freely rotatable relative to the driven shaft and having radially disposed recesses and a clutch including two sets of radially movable rollers arranged to respectively co-operate with the recesses of said driving shaft and the recesses of said driven member for optionally connecting the driven shaft directly to the driving shaft or connecting the driven shaft through said planetary gear with the driving shaft.

5. The combination with a driving and a driven shaft, said driving shaft having radially disposed recesses, a planetary gear system including a ring gear driven from said driving shaft, a sun gear relatively stationary to said shaft and a plurality of intermediate gears mounted on a driven member having a hub rotatable relatively to said driving shaft provided with a plurality of radially disposed recesses, a clutch including two sets of radially movable rollers one set of rollers being arranged to co-operate with the radial recesses of the driving shaft and the other set being arranged to co-operate with the radial recesses of said hub for respectively locking said driven shaft directly to the driving shaft and locking said driven shaft to the driving shaft through said planetary gear.

6. The combination with a driving shaft and a driven shaft, said driving shaft having a plurality of radially disposed recesses, a planetary gear including a ring gear driven from the driving shaft, a sun gear relatively stationary and a plurality of intermediate gears mounted on a driven member having radially disposed recesses and a clutch having two sets of radially disposed rollers connected to the driven shaft, one of said sets being arranged to co-operate with the radially disposed recesses in the driving shaft to directly connect the driven and driving shaft and the other set being arranged to co-operate with the recesses of the driven member to connect the driven shaft and driven member to cause the driven shaft to be driven through the planetary gear.

7. The combination with a driving shaft and a driven shaft, a hub provided with two sets of radially disposed slots and drivingly connected with said driven shaft, a planetary gear including a ring gear, a sun gear, means for holding said sun gear against rotation and a plurality of intermediate gears, a driven member operated by said intermediate gears and having a plurality of radial recesses arranged to co-operate with one set of rollers carried by said hub and said driving shaft having a plurality of radial recesses arranged to co-operate with the other set of rollers mounted on said hub and means for optionally moving said sets of rollers into co-operative relation with their respective recesses.

8. The combination with a driving shaft having radially disposed recesses, of a driven shaft, a planetary gear including a ring gear mounted on and driven by said driving shaft, a sun gear mounted on said driving shaft and stationarily held relatively thereto, a hub rotatably mounted on said driving shaft and carrying a plurality of intermediate gears engaging both said sun gear and ring gear, said hub being provided with radially disposed recesses, a hub drivingly connected with said driven shaft and provided with radially disposed slots, two sets of rollers disposed in said slots one set being arranged to co-operate with the recesses in said driving shaft and the other set being arranged to co-operate with the recesses on the intermediate gear member hub and means for optionally causing said sets of rollers to co-operate with their respective recesses.

9. In a transmission the combination with a casing and a driving and driven shaft journaled in said casing, a planetary gear mounted within said casing, including a ring gear connected to said driving shaft, a pinion-carrying member having a hub rotatably mounted on said driving shaft and carrying pinions meshing with said ring gear, a sun gear rotatably mounted on said hub and meshing with said pinions, a locking plate secured to said casing and having a toothed aperture through which said sun gear is arranged to project, the teeth of said aperture being arranged to engage the teeth of said sun gear and lock the same against rotation, the hub of said pinion-carrier being provided with a plurality of radially disposed recesses and a plurality of radially disposed recesses formed on said driving shaft, a clutch member connected to said driven shaft and including two sets of radially movable rollers, one of said sets being arranged to co-operate with the recesses on said driving shaft and the other set being arranged to co-operate with the recesses on the hub of the pinion carrier.

10. In a transmission the combination with a two part housing, of a driving shaft and driven shaft journaled in said housing, an internal housing ring gear mounted on said driving shaft, a pinion carrier having a hub rotatably mounted on said driving shaft and carrying pinions arranged within said housing gear and meshing therewith, a sun gear rotatably mounted on said pinion carrier hub and meshing with the pinions thereof, a locking plate having a central toothed aperture through which said pinion carrier hub is arranged to project and with the teeth of which the sun gear is arranged to mesh to hold the sun gear against rotation, said pinion carrier hub having radially disposed recesses thereon and said driving member having similarly disposed recesses, a hub connected with the driven shaft and provided with radially disposed slots, two sets of rollers mounted in said slots and means for moving one set of rollers into co-operative relation with the radial recesses on the driving shaft and the other set into co-operative relation with the radial recesses on the pinion carrier hub.

In witness whereof I, JOHN M. SIMPSON, have hereunto set my hand at Muncie, Indiana, this 31st day of July, A. D. one thousand nine hundred and twenty five.

JOHN M. SIMPSON.